US005871413A

United States Patent [19]
Tar et al.

[11] Patent Number: 5,871,413
[45] Date of Patent: Feb. 16, 1999

[54] DRIVEN AXLE ASSEMBLY FOR STEERING BY DRIVING VEHICLES

[75] Inventors: Lorant Tar; Andor Opitz; Tibor Vegh, all of Gyor, Hungary

[73] Assignee: Raba Magyar Vagon- Es Gepgyar RT, Gyor, Hungary

[21] Appl. No.: 837,804

[22] Filed: Apr. 22, 1997

[30] Foreign Application Priority Data

Apr. 23, 1996 [HU] Hungary ................................ 11579/96

[51] Int. Cl.⁶ .................................................. B62D 11/06
[52] U.S. Cl. ................ 475/23; 475/28; 475/29; 74/661
[58] Field of Search ................... 475/18, 23, 24, 475/27–30, 31, 72; 74/661

[56] References Cited

U.S. PATENT DOCUMENTS

| | | | |
|---|---|---|---|
| 3,439,559 | 4/1969 | Binger et al. | 475/28 |
| 3,538,790 | 11/1970 | Polak | 475/24 |
| 4,434,680 | 3/1984 | Riediger et al. | 475/23 |
| 4,505,168 | 3/1985 | Booth et al. | 475/23 |
| 5,088,967 | 2/1992 | Opitz et al. | 475/107 |
| 5,390,751 | 2/1995 | Puetz et al. | 475/24 |

*Primary Examiner*—Khoi Q. Ta
*Attorney, Agent, or Firm*—Young & Thompson

[57] ABSTRACT

A driven axle assembly for vehicles has an axle housing with a main drive, wheel hub units fixed to both sides of the axle housing and being driven by a drive shaft with different rotational movements on both sides of the main drive, within each wheel hub unit, a planetary gearing and a multi-plate friction type wet brake both being coupled to the drive shaft as well as to a drive unit of the vehicle, wherein the multi-plate friction type wet brake is arranged within a ring gear support member, and around planetary gears of the planetary gearing a ring gear is connected to them.

The improvement achieved by this invention is that a driving assembly is coupled to the ring gear of the planetary gearing of each and every wheel hub unit arranged on the driven axle whereas a difference between the rotational speeds of the ring gear within the wheel hub units, respectively, are proportional to a difference between the rotational speeds of the wheel hub units arranged on the driven axle of the vehicle.

11 Claims, 6 Drawing Sheets

DRIVEN AXLE ASSEMBLY FOR STEERING BY DRIVING VEHICLES

BACKGROUND OF THE INVENTION

1. Field of the Invention

The invention relates to a driven axle assembly with wheel hubs being driven with different rotational speeds. For this, the axle assembly comprises an axle housing with a main drive, wheel hub units fixed to both sides of the axle housing and being driven by a drive shaft with different rotational movements on both sides of the main drive, within each wheel hub unit, a planetary gearing and a multi-plate friction type wet brake both being coupled to the drive shaft as well as to a drive unit of the vehicle, wherein the multi-plate friction type wet brake is arranged within a ring gear support member, and around planetary gears of the planetary gearing a ring gear is connected to them.

2. Description of the Related Art

U.S. Pat. No. 5,088,967 describes a driven axle assembly of heavy duty vehicles such as muckshifters, mining machines, agricultural power machines and vehicles for handling and transporting materials, which has a planetary gearing and a multi-plate friction type wet brake. This solution is able to cope with the high loads and stresses applied on driven axle assemblies of vehicles as mentioned above, thus there are quite widely spread solutions.

The driven axle assemblies of this type, however, are not suitable to applications in driven axles with steering appliances. It is not unusual, that these kind of heavy duty vehicles have caterpillar or rubber creepers or belts instead of conventional wheels, and these creepers are driven for moving the vehicle. In these cases, the heavy duty vehicles are steered with different movement of the creepers which is reached by different rotational speeds of the creeper drivers on both sides of the vehicle. Often is this known solution be used with vehicles having conventional wheels, wherein the wheels themselves rotate with different speed, during the steering action.

In summary, the previously known solutions providing different rotational speeds on both sides of the vehicles are not suitable for applications under heavy duty conditions but, as mentioned above, the need to overcome this disadvantage is quite urgent.

SUMMARY OF THE INVENTION

The main objective of the present invention is to provide a driven axle assembly with wheel hubs being driven with different rotational speeds wherein the idea of different rotational drives on both sides of the vehicle can be utilised with heavy duty vehicles as well and wherein the advantages of the well proved axle assemblies of such kind of vehicles can be preserved without increase of complexity, production and operation costs and decrease of duration, load bearing capacity and reliability.

The basic idea of this invention is to provide separate drives on both sides of the axle assembly, more precisely within both wheel hubs at the outer ends of the axle of the vehicle.

Hence, according to the invention, a driven axle assembly for vehicles has an axle housing with a main drive wheel hub units fixed to both sides of the axle housing and being driven by a drive shaft with different rotational movements on both sides of the main drive, within each wheel hub unit, a planetary gearing and a multi-plate friction type wet brake both being coupled to the drive shaft as well as to a drive unit of the vehicle, wherein the multi-plate friction type wet brake is arranged within a ring gear support member, and around planetary gears of the planetary gearing a ring gear is connected to them.

The improvement is in that a driving assembly is coupled to the ring gear of the planetary gearing of each and every wheel hub unit arranged on the driven axle whereas a difference between the rotational speeds of the ring gear within the two wheel hub units, respectively, are proportional to a difference between the rotational speeds of the wheel hub units arranged on the driven axle of the vehicle.

Various optional or preferred features are set out in the detailed description forming part of this specification.

Thus, in one exemplified embodiment of this invention, the drive unit of the vehicle is a hollow axle housing, and the axle housing is rotatably arranged on a hollow spindle connected to the axle housing of the vehicle and at least partially surrounding the drive shaft, and a drive input gear of the driving assembly is connected to a drive of the driving assembly as well as to a toothed sleeve which is rotatably arranged in the hollow spindle and surrounds the drive shaft, whereas the ring gear support member is fixed to the toothed sleeve without rotation and is coupled to the ring gear of the planetary gearing. Therein, said inlet gear of the driving assembly may have straight or inclined teeth, and the toothed sleeve may have a ring gear with teeth being conform to that of the inlet gear.

It is also preferred, according to the invention, that the input gear of the driving assembly is a worm gear of a worm gear drive, and the toothed sleeve has a ring with internal worm spline being in conformity to an outer worm spline of the input gear.

A further preferred embodiment is wherein the drive unit of the vehicle is formed as a shaft end being rotatably arranged within a casing securely fixed to the axle housing of the vehicle, and in the inside of the casing the driving assembly has a toothed wheel being fixed to the ring gear support member, and the ring gear support member is in torque transmitting connection with the ring gear.

It is still another preferred embodiment, wherein the drive unit of the vehicle is formed as a shaft end being rotatably arranged within a casing securely fixed to the axle housing of the vehicle, and the ring gear support member inhousing the multi-plate friction type wet brake is fixed to the casing, whereas a sleeve being rotatably arranged within the casing is connected to the ring gear of the planetary gearing in a torque transmitting manner, and the sleeve is kinematically connected to the driving assembly. In this case, a splined connection can be provided between the sleeve and the driving assembly. The splined connection can be provided as a ring gear formed on or fixed to the sleeve and a drive input splined wheel being rotationally arranged in the casing, and the input splined wheel may be connected to the drive of the driving assembly. Preferably, the ring gear formed on or fixed to the sleeve is formed as a ring with internal worm spline and the drive input wheel has an outer worm spline.

Most preferably, the driving assembly is formed as a hydro-motor, a stationary portion of which is fixed to the casing of the shaft end, and a rotary portion of which is torque transmitting connection to the ring gear of the planetary gearing. In this case, it is still preferred, when the stationary portion of the hydro-motor is formed as a tubular shaft and the drive shaft is let through the tubular shaft being in splined connection with the ring gear. Further, the tubular shaft can preferably have a disc being splined on its radially outer flange with outer teeth adjoining the inner spline of the ring gear.

Finally, the embodiment is also preferred wherein to each and every wheel hub units arranged on the same axle of the vehicle is attached a separate driving assembly, and the driving assemblies are formed as hydro-motors each being interconnected hydraulically through hydraulic conduits having at least one hydraulic pump, and a pressure outlet of the hydraulic pump is connected to one of the hydro-motors, respectively.

BRIEF DESCRIPTION OF THE DRAWINGS

Embodiments of this invention will now be described by way of example with reference to the accompanying drawings, in which.

DETAILED DESCRIPTION OF THE PREFERRED EMBODIMENTS

U.S. Pat. No. 5,088,967 describes a driven axle assembly of heavy duty vehicles with planetary gearing and a multi-plate friction type wet brake. This description serves as a basis for this discussion of preferred embodiments in this invention. In the drawings, a wheel hub unit and the portions adjoined to it are shown; the same assembly is on the other end of the axle of the vehicle.

Figure 1:
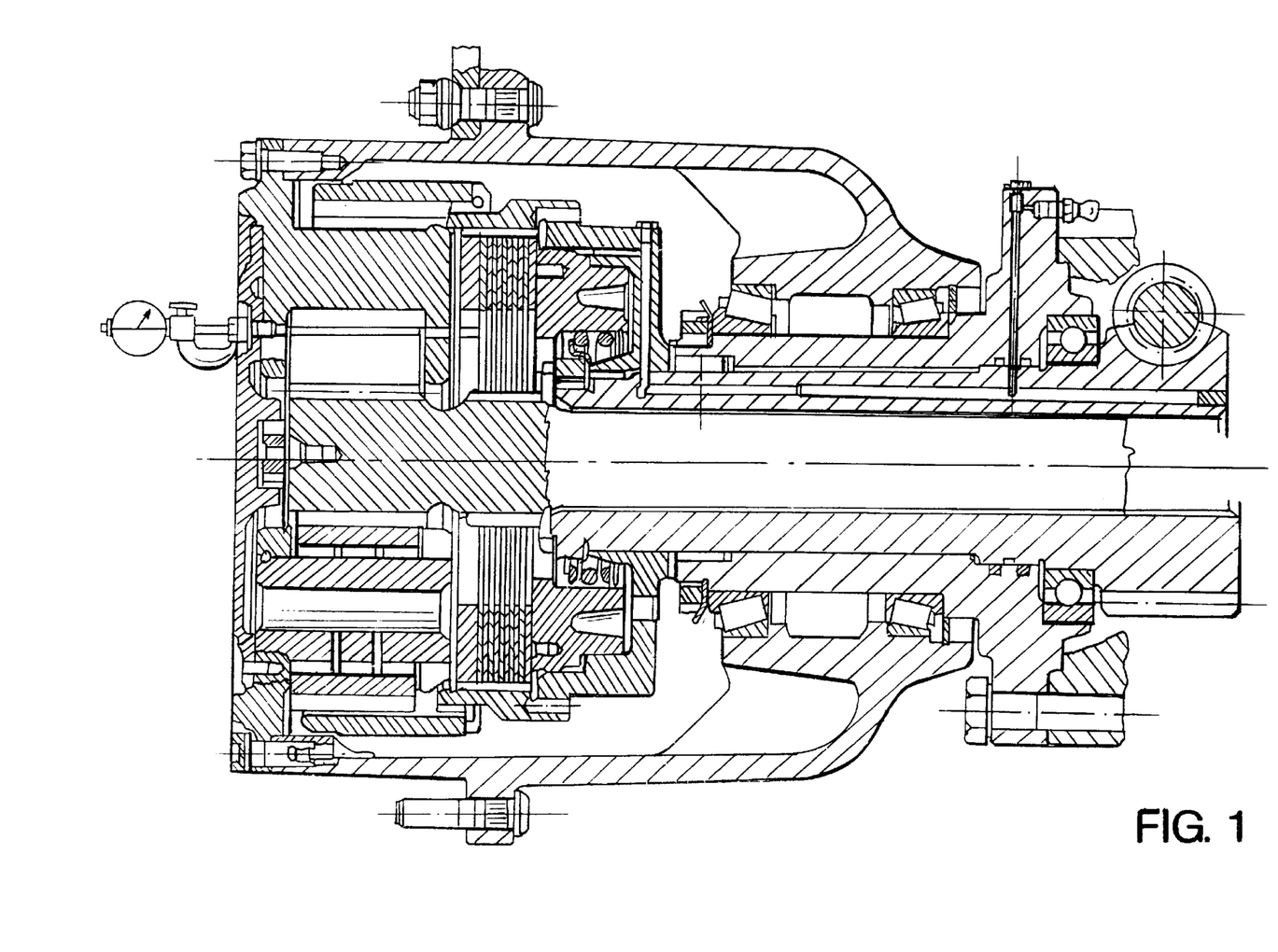
FIG. 1 illustrates a preferred embodiment of the axle assembly as in this invention: a part of a cross sectional view of an axle.

FIG. 1 shows a drive unit 2 providing the rotational movement for moving the vehicle and being coupled to an axle housing 1 of the vehicle. To the axle housing 1, a hollow spindle 3 is stationarily fixed, in the hollow inside of which a drive shaft 4 connected to the main drive of the vehicle is let through. In this example, the drive unit 2 moving the vehicle is formed as a axle housing 5 rotatably arranged on the hollow spindle 3. Onto a flange 6 of the axle housing 5, a wheel rim 7 of the wheel of the vehicle is detachably connected. The axle housing 5 is rotatable due to roller bearings 8, 9, with conical rollers, in this example. The inside of the wheel hub unit is sealed against the outworld by a seal 10.

Around drive shaft 4, a toothed sleeve 12 is rotatably arranged onto which a ring gear support member 11 is securely fixed. Toothed sleeve 12 is rotatable against hollow spindle 3 by roller bearings 13. Ring gear support member 11 is held on place by a bearing nut 14 on toothed sleeve 12. Ring gear support member 11 inhouses a multi-plate friction type wet brake 15 of the wheel hub unit; multi-plate friction type wet brake 15 has conventional constriction as described e. g. in U.S. Pat. No. 5,088,967. Inner brake plates of multi-plate wet brake 15 mesh with outer splines of drive shaft 4 whilst outer brake plates of multi-plate wet brake 15 mesh with inner splines provided on an inner ring surface in this region of the ring gear support member 11. The inner brake plates and the outer brake plates area arranged alternately within the multi-plate friction type wet brake 15.

At the outer end of ring gear support member 11 being opposite to axle housing 1, a planetary gearing 16 of the wheel hub unit is provided. A ring gear 17 of it is arranged as a torque trust but slightly disposable on this end of the ring gear support member 11. For this purpose, ring gear 17 having inner splines is attached to outer splines 18 formed on ring gear support member 11. As a result, a torque transmitting connection is provided between ring gear 17 and ring gear support member 11. On the inner splines of ring gear 17, planetary gears 19 are running and moving around a sun wheel 20 formed at the end of drive shaft 4.

In sense of the invention, a driving assembly (not shown in the drawing) is attached to ring gear 17 of planetary gearing 16 arranged within the wheel hub unit for providing a difference in the rotational speeds of the wheel hub units arranged on the same driven axle which results in the steering action of the vehicle. The connection between this driving assembly and the driven axle assembly as in this invention is shown by two examples in FIG. 1. On the lower half of the drawing, a drive input gear 21 has straight or inclined teeth meshing with teeth 22 provided on toothed sleeve 12 having the same pattern.

On the above portion of FIG. 1, at the same time, a drive input gear 21A is shown for having worm spline on its outer surface, whereas toothed sleeve 12 has an internal worm spline 22A.

According to the invention, the difference between the rotational speeds of the driving assemblies of the wheel hub units, respectively, are proportional to a difference between the rotational speeds of the wheel hub units arranged on the driven axle of the vehicle which results in steering action of the vehicle. This is reached during the operation of the embodiment of the invention as shown in FIG. 1 by a rotational displacement of ring gear 17 of planetary gearing 16 with the aid of the driving assembly resulting the steering action. If we would like to move with the vehicle straight ahead, then drive input will not be applied at the driving assemblies and care is taken to held ring gear 17 in place without any rotation. This can easily be solved with drive input gear 21A having worm spline since it is formed as a self-blocking one. In case of drive input gear 21, auxiliary means (not shown) serve for fixing ring gear 17 of planetary gearing 16 without rotation for the straight movement of the vehicle.

In case of turning the vehicle, auxiliary rotation is applied on ring gear 17. If the vehicle turns left, then ring gear 17 within the wheel hub unit on the left side of the vehicle is rotated in the same sense as the wheel 7 of the vehicle rotates, thus, the rotation number of wheel 7 increases in respect to that of the straight movement of the vehicle, therefore, left wheel 7 on the axle rides a longer route during the same time than the other wheel 7 of the vehicle. For this, rotation of the driving assembly is applied on toothed sleeve 12 by the interaction of drive input gears 21, 21A and splines 22, 22A and thus, toothed sleeve 12 rotates in respect of drive shaft 4. Toothed sleeve 12, however, takes ring gear support member 11 with it which in turn rotates ring gear 17 connected at outer spline 18.

As a matter of course, both of the two wheel hub units on the axle assembly can be driven in opposite directions and with this, the steering action can be made more effective, since the difference between the rotational speeds of the driving assemblies will be greater. If, in the previous example, ring gear 17 of the left hand wheel hub unit is driven in the same direction as the wheel 7 rotates, then ring gear 17 in the right hand wheel hub unit shall be driven in opposite direction. The steering action will be proportional to the difference of the rotations of the ring gears on both sides of the axle.

As it is well known in the conventional solutions, ring gear 17 is in connection with three planetary gears 19 and as a result of the arrangement as in this invention, ring gear 17 freely takes up the uncertainty of rolling of planetary gears 19. This results in a minimum deformation of ring gear 17 under load and in a nearly ideal roll-down of planetary gears 19. The meshing of teeth has a stable axle distance during the whole turn around, thus, it is not depending on the accuracy or the deformation of the other constructional parts. The meshing splines at ring gear 17 can freely be dimensioned, and this prevents the increased or multiplied load acting on the teeth. Further, the worm gear drive seems to be advantageous with respect of the self-blocking character if this drive.

Figure 2:
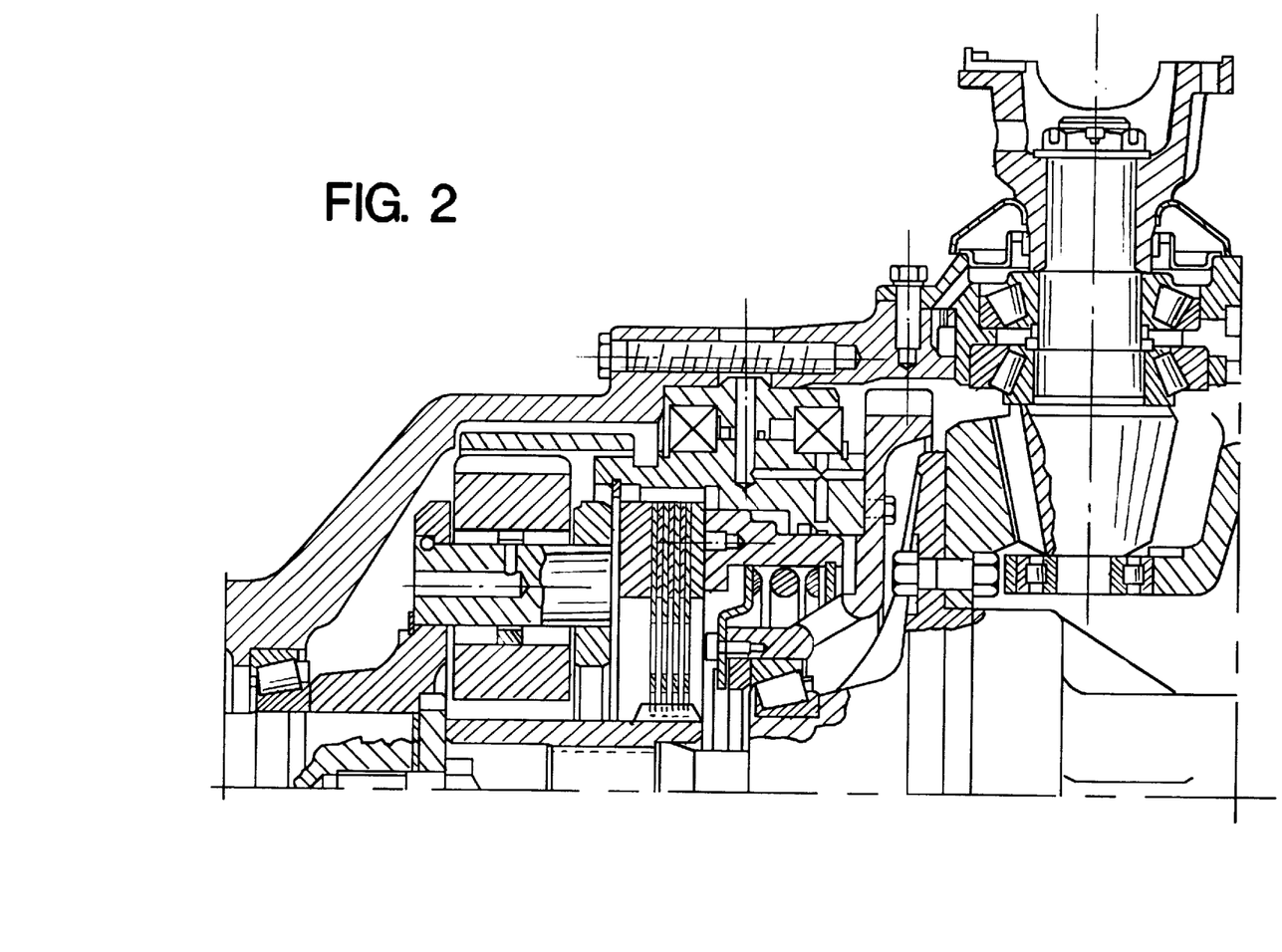
FIG. 2 is a same view as in FIG. 1, however a smaller portion of the cross section of another embodiment.

In the case of the exemplified embodiment as shown in FIG. 2, the drive unit of the vehicle is formed as a shaft end 23 being rotatably arranged within a casing 24 securely fixed to the axle housing 1 of the vehicle. Shaft end 23 is driven by its bevel gear 25 and a disc gear 26 attached to it and the drive shaft 4. Arrangement of multi-plate friction type wet brake 15 and ring gear support member 11 is the same as in FIG. 1. Outer spline 18 connects ring gear support member 17 holding planetary gear 19 as a part of planetary gearing 16. A planetary carrier 27 of planetary gearing 16 is rotationally arranged in casing 24.

In this embodiment of the invention, a drive input toothed wheel 28 of the steering driving assembly is within the casing 24 and fixed to ring gear support member 11. At the same time, ring gear support member 11 is rotational at bearings 29 in respect of casing 24.

In operation of the embodiment shown in FIG. 2, the rotational movement is forwarded from the steering driving assembly to ring gear support member 11 through toothed wheel 28, and ring gear support member 11 turns at bearings 29 in casing 24 and moves ring gear 17 with outer spline 18. This results in the difference in rotations of wheel hub units on the same axle as described with FIG. 1 if the other wheel hub unit is not driven or if its driven in opposite direction. This embodiment has the surplus advantage of higher loadability of the driving assembly which has its reason of the application of bevel gear 25 and disc wheel 26.

Figure 3:
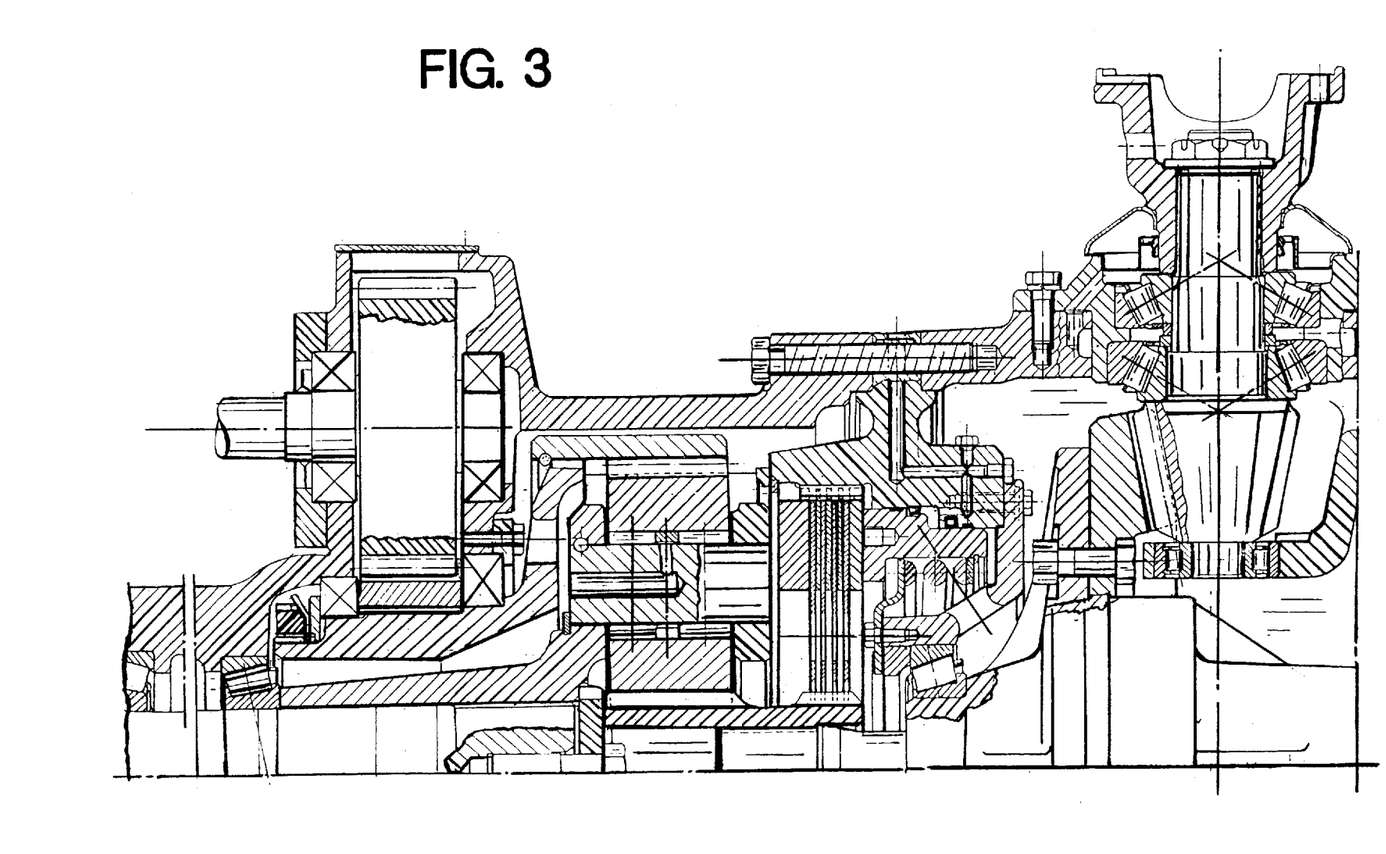
FIG. 3 is a same view as in FIG. 2, however for still another embodiment.

The embodiment as shown in FIG. 3 is quite similar to that of FIG. 2, however, drive input of the steering driving assembly comes from the other side and from outside of the planetary gearing 16. In this example, ring gear support member 11 inhousing multi-plate friction type wet brake 15 is securely fixed to casing 24 and is not connected to ring gear 17 of the planetary gearing 16. Drive input of the steering driving assembly takes place with the aid of a toothed wheel 30 being rotationally arranged in casing 24. Toothed wheel 30 is in torque transmitting connection with a sleeve 31 rotationally arranged in casing 24 at a spline 32 of sleeve 31, whilst an outer spline 33 of sleeve 31 is attached to the inner spline of ring gear 17.

In operation, drive of the steering driving assembly is forwarded by toothed wheel 30 through its spline 32 to sleeve 31 rotating ring gear 17 through spline 33, in a measure as it is required by the steering action. This results in the same operation as described with FIG. 1.

Figure 4:
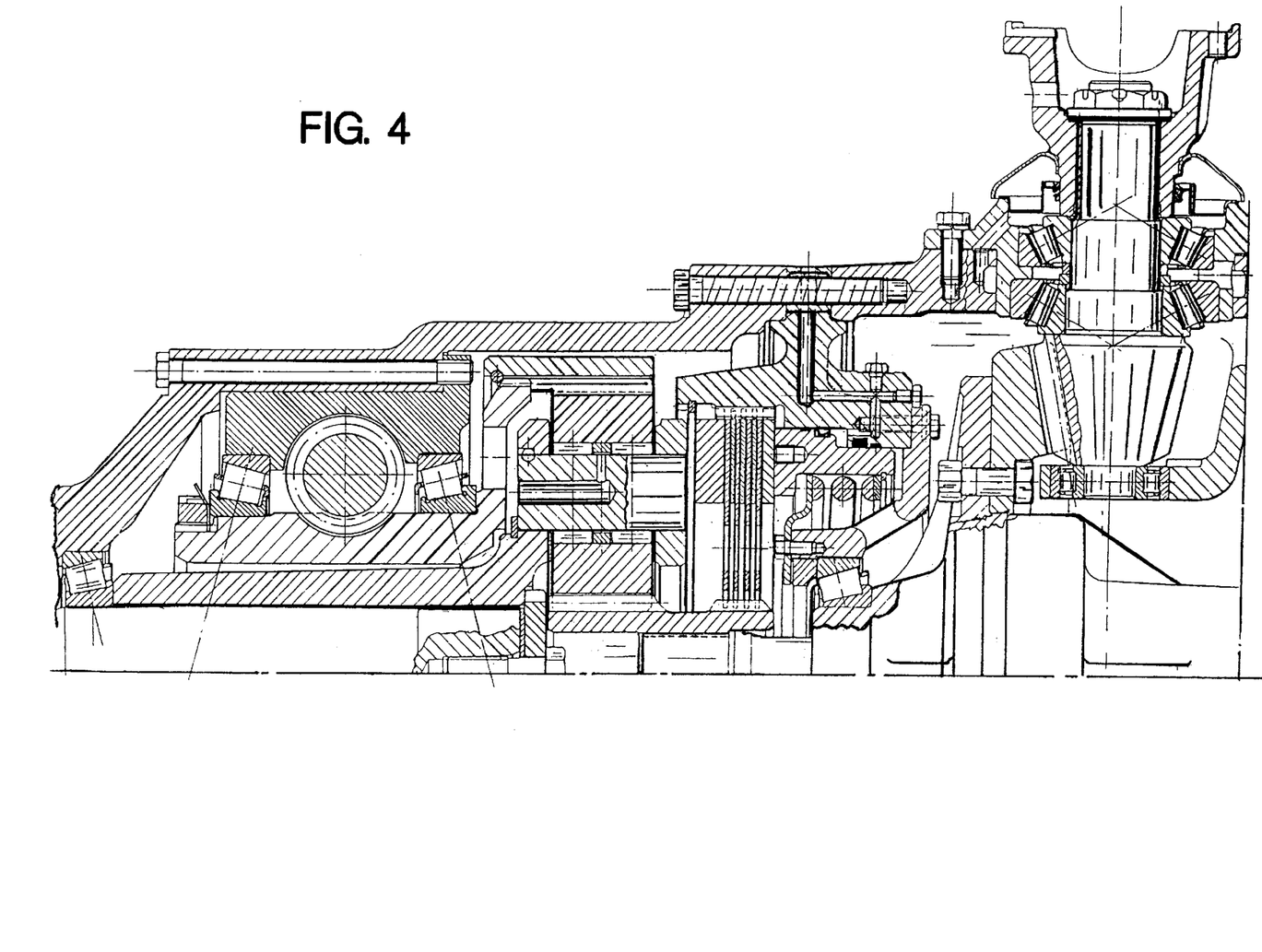
FIG. 4 shows a portion of the cross section of just another embodiment.

Construction and operation of the embodiment as shown in FIG. 4 is quite the similar to that of embodiment in FIG. 3. The drive input of the steering driving assembly differs in the application of a worm gear 34 as a drive input gear being connected to a worm ring gear 35. Thus, the rotation from the driving assembly is transmitted through the worm gear 34 to the worm ring gear 35 rotating the sleeve 34 in the casing 24. This rotation is then transmitted by the spline 33 of sleeve 31 to ring gear 17 resulting in the drive input of the planetary gearing 16.

Figure 5:
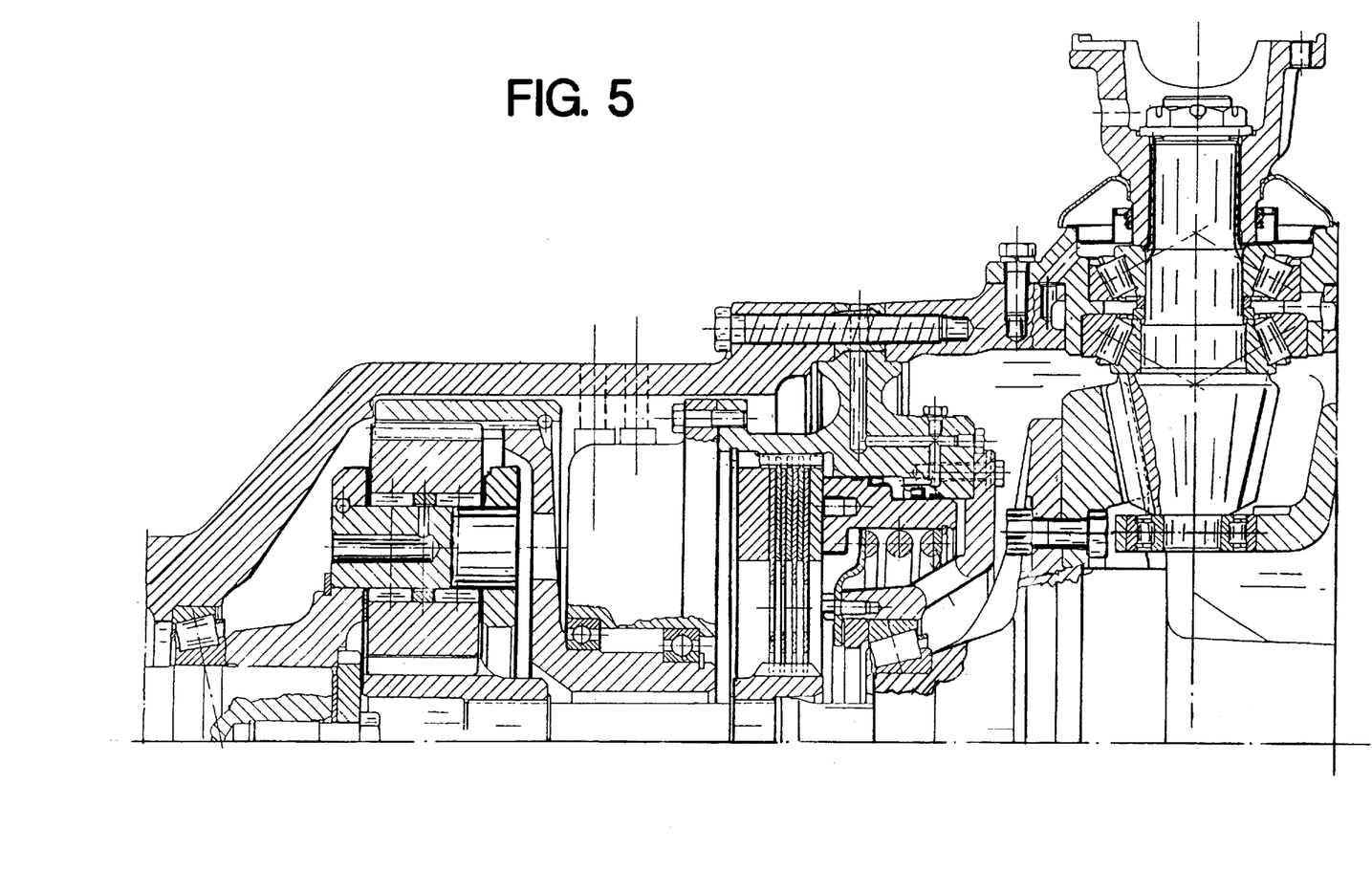
FIG. 5 is a same view as in FIG. 4, however for still another embodiment.

In the embodiment as shown in FIG. 5, the steering driving assembly is a hydro-motor 36 known per se. The conventional hydro-motor 36 produces rotational movement with quite high torque under the impact of the hydraulic liquid introduced into it under high pressure. The stationary portion, in this example: a casing 37 of hydro-motor 36 is fixed by ring gear support member 11 to casing 24 of shaft end 23, whilst its rotational portion being rotatable in respect of casing 37 at bearings 38 is in torque transmitting connection with ring gear 17 of planetary gearing 16. In this case, the rotational portion of hydro-motor 36 is formed as a tubular shaft 39, in which drive shaft 4 is let through in freely rotatably way. Tubular shaft 39 has a round disc 40 having a spline 41 on its radially outward flange. This spline 41 is attached to the inner spline of ring gear 17 which results in the torque transmitting connection between the rotational portion of hydro-motor 36 and ring gear 17 of planetary gearing 16.

The operation of the exemplified embodiment shown in FIG. 5 is the same as that of the embodiment in FIG. 4. Under the impact of the pressurised liquid, the rotational portion of hydro-motor 36, i. e. tubular shaft 39 and disc 40 will rotate and turn ring gear 17 of planetary gearing 16 by spline 41.

As it will be clear from the drawing, hydro-motor 36 itself can be arranged within the wheel hub unit, this extremely simplifies the construction, the drive input, and the wheel hub unit can again be a fully closed construction. Since hydro-motor 36 is able to produce rotational movement in both directions, it is enough to provide only one hydro-motor 36 on the axle, since with changing the direction of rotation of this single hydro-motor 36, the steering action can be initialised in both directions.

Figure 6:
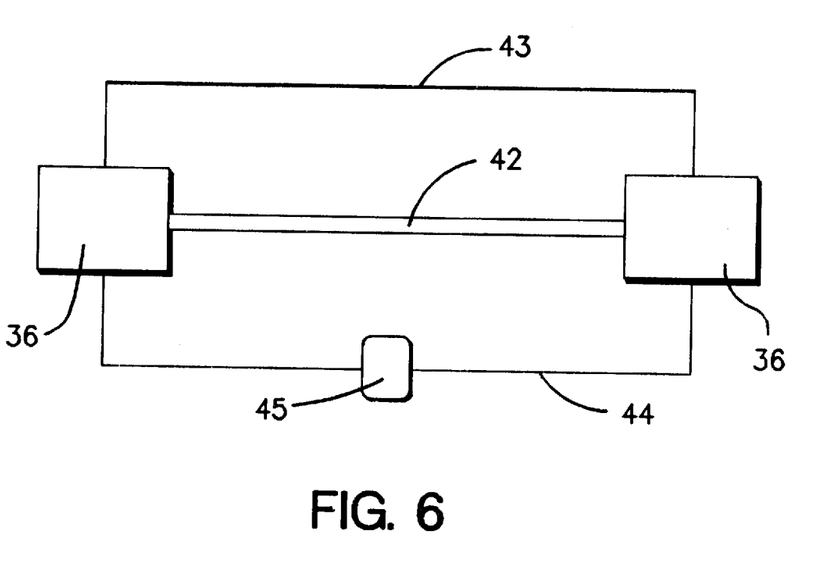
FIG. 6 is an operational diagram of the axle assembly as in this invention.

The diagram of FIG. 6 shows an example, wherein one hydro-motor 36 is provided at each of both ends of a driven axle assembly 42 of the vehicle. The hydro-motors 36 are interconnected by two separate hydraulic conduits 43 and 44. Hydraulic conduit 44 has a usual hydraulic pump 45.

In operation of this embodiment, the pressure between both hydro-motors 36 are equalised through hydraulic conduit 43 and the vehicle moves straight ahead. If we would like to turn to the right with the vehicle, hydraulic pump 45 will be operated, and a pressure outlet of it will be connected to hydro-motor 36 on the left side and its suction inlet to hydro-motor 36 on the right side of the vehicle. In this case, right hand hydro-motor 36 operates as a suction pump and forwards the hydraulic agent to the left hand hydro-motor 36 under high pressure. Thus, ring gear 17 in the wheel hub units on both ends of the driven axle 42 of the vehicle will turn in opposite directions resulting in the difference in the speed of rotation of the two wheel hub units and in the steering action of the vehicle. Since the very high pressure necessitated for driving the hydro-motor 36 is produced by the right hand hydro-motor 36, hydraulic pump 45 has to provide only a relatively small pressure to ensure the steering action. If hydraulic pump 45 is a gear pump, for example, then the hydraulic pump 45 can run in opposite direction, function of hydro-motors 36 on both sides will be interchanged and the steering action takes place in the other direction.

The most important advantage is apparent in the very simple construction of the arrangement as described. The invention, however, utilises all previous constructional solutions providing a well-known and reliable axle assembly of heavy duty vehicles. It is important, too, that only one steering driving assembly attached to one of the wheel hub units is inevitably necessary for initialising the steering action. The reason if this lies in the fact, that rotating the drive input gear 21, 21A and, thus, applying additional rotation on ring gear 17 of planetary gearing 16 are possible in both directions with one and the same hydro-motor 36 having two operational directions. Thus, operating the hydro-motor 36 in opposite direction, steering operation can be initialised in both directions with only one steering driving assembly. This is a quite important advantage when the complexity and security of vehicle steering drives are considered.

We claim:

1. Driven axle assembly for vehicles comprising
   an axle housing with a main drive,
   wheel hub units fixed to both sides of the axle housing and being driven by a drive shaft with different rotational movements on both sides of the main drive,
   within each wheel hub unit, a planetary gearing and a multi-plate friction type wet brake both being coupled to the drive shaft as well as to a drive unit of the vehicle, wherein the multi-plate friction type wet brake is arranged within a ring gear support member, and around planetary gears of the planetary gearing, a ring gear is connected to them,
characterised by that
   a driving assembly is coupled to the ring gear of the planetary gearing of each and every wheel hub unit arranged on the driven axle whereas a difference between the rotational speeds of the ring gear within the wheel hub units, respectively, are proportional to a difference between the rotational speeds of the wheel hub units arranged on the driven axle of the vehicle.

2. Axle assembly as claimed in claim 1, wherein the drive unit of the vehicle is a hollow axle housing, and the axle housing is rotatably arranged on a hollow spindle connected to the axle housing of the vehicle and at least partially surrounding the drive shaft, and a drive input gear of the driving assembly is connected to a drive of the driving assembly as well as to a toothed sleeve being rotatably arranged in the hollow spindle and surrounding the drive shaft, whereas the ring gear support member is fixed to the toothed sleeve without rotation and is coupled to the ring gear of the planetary gearing.

3. Axle assembly as claimed in claim 2, wherein said input gear of the driving assembly is a worm gear of a worm gear drive, and the toothed sleeve has a ring with internal worm spline being in conformity to an outer worm spline of the input gear.

4. Axle assembly as claimed in claim 1, wherein the drive unit of the vehicle is formed as a shaft end being rotatably arranged within a casing securely fixed to the axle housing of the vehicle and in the inside of the casing the driving assembly has a toothed wheel being fixed to the ring gear support member, and the ring gear support member is in torque transmitting connection with the ring gear.

5. Axle assembly as claimed in claim 1, wherein the drive unit of the vehicle is formed as a shaft end being rotatably arranged within a casing securely fixed to the axle housing of the vehicle and the ring gear support member inhousing the multi-plate friction type wet brake is fixed to the casing, whereas a sleeve being rotatably arranged within the casing is connected to the ring gear of the planetary gearing in a torque transmitting manner, and the sleeve is kinematically connected to the driving assembly.

6. Axle assembly as claimed in claim 5, wherein a splined connection is between the sleeve and the driving assembly, and the splined connection is provided as a ring gear either formed on or integral fixed to the sleeve and a drive input splined wheel being rotationally arranged in the casing, and the input splined wheel is connected to the drive of the driving assembly.

7. Axle assembly as claimed in claim 6, wherein the ring gear either formed on or integral to the sleeve is formed as a ring with internal worm spline and the drive input wheel has an outer worm spline.

8. Axle assembly as claimed in claim 7, wherein the driving assembly is formed as a hydro-motor, a stationary portion of which is fixed to the casing of the shaft end, and a rotary portion of which is torque transmitting connection to the ring gear of the planetary gearing.

9. Axle assembly as claimed in claim 8, wherein the stationary portion of the hydro-motor is formed as a tubular shaft and the drive shaft is let through the tubular shaft being in splined connection with the ring gear.

10. Axle assembly as claimed in claim 9, wherein the tubular shaft has a disc being splined on its radially outer flange with outer teeth adjoining the inner spline of the ring gear.

11. Axle assembly as claimed in claim 1, wherein to each and every wheel hub units arranged on the same axle of the vehicle is attached a separate driving assembly, and the driving assemblies are formed as hydro-motors each being interconnected hydraulically through hydraulic conduits having at least one hydraulic pump, and a pressure outlet of the hydraulic pump is connected to one of the hydro-motors, respectively.

* * * * *